(12) United States Patent
Bonanno

(10) Patent No.: US 11,168,803 B2
(45) Date of Patent: Nov. 9, 2021

(54) VALVE

(71) Applicant: CPT GROUP GmbH, Hannover (DE)

(72) Inventor: Rosario Bonanno, Bad Soden (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/471,863

(22) PCT Filed: Dec. 13, 2017

(86) PCT No.: PCT/EP2017/082644
§ 371 (c)(1),
(2) Date: Jun. 20, 2019

(87) PCT Pub. No.: WO2018/114530
PCT Pub. Date: Jun. 28, 2018

(65) Prior Publication Data
US 2019/0316701 A1   Oct. 17, 2019

(30) Foreign Application Priority Data

Dec. 22, 2016   (DE) .......................... 102016226098.7

(51) Int. Cl.
*F16K 27/02* (2006.01)
*F16K 31/06* (2006.01)

(52) U.S. Cl.
CPC ........ *F16K 27/029* (2013.01); *F16K 31/0655* (2013.01)

(58) Field of Classification Search
CPC ...... F16K 25/005; F16K 27/00; F16K 27/029; F16K 31/0655; F16K 31/0693; F16K 31/0686; F16K 39/024; F16J 15/3204; F02B 37/16; F02B 37/18; F02B 37/186; H01F 7/1607
(Continued)

(56) References Cited

U.S. PATENT DOCUMENTS 4,720,079 A * 1/1988 Iizuka .................. B29D 99/005
251/331
6,039,323 A * 3/2000 Mockenhaupt ......... F02F 7/006
277/593
(Continued)

FOREIGN PATENT DOCUMENTS

CN   201581981 U   9/2010
CN   102187134   9/2011
(Continued)

OTHER PUBLICATIONS

Office Action dated Jun. 24, 2020 issued in Korean Patent Application No. 10-2019-7020785.
(Continued)

*Primary Examiner* — Matthew W Jellett
(74) *Attorney, Agent, or Firm* — Cozen O'Connor

(57) ABSTRACT

A valve having a housing, a solenoid arranged in the housing, a pin movable by the solenoid, a piston connected to the pin, a second housing part that bears against the housing and which partially surrounds the piston, and a seal for sealing off the valve. The second housing part is composed of metal, and the seal, which seals off the valve, is arranged on that side of the second housing which faces toward the housing.

10 Claims, 3 Drawing Sheets

(58) Field of Classification Search
USPC .................. 251/282, 367, 368; 277/353, 600
See application file for complete search history.

(56) References Cited

U.S. PATENT DOCUMENTS

| | | | |
|---|---|---|---|
| 2001/0002041 A1 | 5/2001 | Hayakawa | |
| 2017/0261113 A1* | 9/2017 | Sato | ........................ B60T 8/363 |
| 2017/0298812 A1* | 10/2017 | Lenk | ........................ F16K 1/46 |

FOREIGN PATENT DOCUMENTS

| | | |
|---|---|---|
| CN | 102869869 | 1/2013 |
| CN | 104870873 | 8/2015 |
| CN | 105612328 | 5/2016 |
| DE | 94 09 028 | 10/1995 |
| DE | 10048499 | 4/2002 |
| DE | 10 2004 044439 | 4/2006 |
| DE | 10 2012 224131 | 6/2014 |
| DE | 10 2013 220685 | 4/2015 |
| DE | 10 2014 113540 | 2/2016 |
| DE | 10 2014 226885 | 6/2016 |
| JP | S 63-009568 | 1/1988 |
| JP | H 05-202734 | 8/1993 |
| JP | 2012-031968 | 2/2012 |
| JP | 2014-003541 | 1/2014 |
| WO | WO 2006/029814 | 3/2006 |
| WO | WO 2016/041951 | 3/2016 |
| WO | WO 2016/162968 | 10/2016 |
| WO | WO 2018/114525 | 6/2018 |
| WO | WO 2018/114529 | 6/2018 |
| WO | WO 2018/114616 | 6/2018 |
| WO | WO 2018/114644 | 6/2018 |

OTHER PUBLICATIONS

Office Action dated Mar. 15, 2021 issued in Korean Patent Application No. 10-2019-7020785.

* cited by examiner

PRIOR ART

VALVE

CROSS REFERENCE TO RELATED APPLICATIONS

This is a U.S. national stage of application No. PCT/EP2017/082644, filed on Dec. 13, 2017. Priority is claimed on German Application No. DE102016226098.7, filed Dec. 22, 2016, the content of which is incorporated here by reference.

BACKGROUND OF THE INVENTION

1. Field of the Invention

The invention relates to a valve having a housing, a solenoid arranged in the housing, a pin movable by the solenoid, a piston connected to the pin, a second housing part that bears against the housing and which partially surrounds the piston, and a seal for sealing off the valve.

2. Description of the Prior Art

Such valves are used, inter alia, as a diverter valve on a turbocharger in a motor vehicle to open up a bypass to the suction side in overrun operation, and are thus known. To prevent excessive deceleration of the turbocharger and to ensure a fast launch, fast opening and closing of the valve is an essential prerequisite. The valve seat is formed by the housing of the turbocharger, on which the valve is flange-mounted. For the sealing of the valve, a seal is arranged in the housing. The seal surrounds the second housing part, which is connected by a detent connection to the housing. The second housing part, which for weight reasons is composed of plastic, must, for sufficient strength and for production reasons, have a certain structure and wall thickness. This requires corresponding structural space. Furthermore, the seal surrounding the second housing part must be formed with a corresponding diameter. Such valves are therefore adaptable to different installation spaces only to a limited extent.

SUMMARY OF THE INVENTION

One aspect of the invention is based on creating a valve which, by its construction, allows use in different installation locations.

According to one aspect of the invention, the second housing part is composed of metal, and the seal that seals off the valve is arranged on that side thereof that faces toward the housing.

Formation of the second housing part from metal has the advantage that it can, in relation to a plastics part, be formed with a considerably reduced wall thickness owing to the higher strength of metal. The smaller wall thickness permits a smaller diameter of the second housing part for an unchanged piston diameter. The valve can thus be installed into smaller openings. Likewise, the seal can be made smaller in diameter, resulting in improved sealing. With the formation of the second housing part from metal, higher temperature resistance is also achieved, which likewise allows use under usage conditions that were hitherto not possible. Furthermore, a metallic second housing part permits a connection to the housing by a detent connection or other connections.

In an advantageous refinement, good resistance to a wide variety of throughflowing media and media mixtures, preferably exhaust gas of an internal combustion engine, is achieved in that the metal is a high-grade steel, preferably a chromium-nickel steel.

According to a further advantageous refinement, the second housing part can be produced particularly inexpensively as a deep-drawn part. The shaping of the housing part can be achieved in only one working step without further processing operations.

It has been found that, for the use of the valve in a motor vehicle, a wall thickness of the second housing part of 0.3 mm to 3 mm, preferably of 0.5 mm to 1 mm, is sufficient to ensure sufficient strength and thus reliable operation of the valve.

In a particularly advantageous refinement, the second housing part has, at its side facing toward the housing, a radially outwardly projecting edge. The edge can be used as required to create a defined abutment surface for the setting-down on the housing. The edge can be generated in a particularly simple and thus inexpensive manner during the formation of the second housing part by deep drawing.

In a further refinement the seal is arranged at the edge by virtue of the seal surrounding at least one region of the edge. In this way, the seal can be formed inexpensively with a relatively small diameter. This arrangement permits fixing of the seal without additional elements. Holding parts for the seal can be omitted. With the connection of seal and second housing part, the installation process is improved, because the seal can now be pre-installed.

According to one advantageous refinement, a captive arrangement of the seal on the second housing part is achieved in that the edge has recesses and the seal penetrates the recesses. Depending on the operating conditions and the seal material, the edge may have 2 to 20, preferably 3 to 12, in particular 4 to 8 recesses.

In a particularly simple refinement, the recesses are of circular form. If the radial extent of the edge is limited and/or in order to provide a sufficient cross section of the seal material in the recesses, the recesses may be extended along the circumference of the edge, preferably oval or in the shape of a circular arc.

In another advantageous refinement, in order to ensure sufficient mechanical strength of the edge, the recesses account for no more than 30%, preferably no more than 20%, of the area of the edge.

A particularly reliable seal is achieved with a seal composed of fluorinated rubber.

According to a further refinement, the second housing part is connected to the housing by a press-fit connection. The advantage consists in that no additional fastening elements are required. Furthermore, owing to the omission of detent elements, the housing can be of significantly simpler design, which results in a considerable cost reduction in the production of the housing.

In a particularly simple refinement, the housing has a cylindrical portion that projects in the direction of the second housing part and onto which the second housing part is pressed. This type of connection utilizes the existing geometry of the components for the connection. Here, the provision of a cylindrical portion on the housing involves little outlay. For the pressing-together, the radially outwardly projecting edge of the second housing part may furthermore be used as an engagement point for a pressing tool.

In a further refinement, the press-fit connection can be realized in a particularly reliable manner in terms of a process if the radially projecting edge of the second housing part serves as an abutment for the housing. Likewise, the second housing part may have a different diameter for the press-fit connection than in the remaining region of its lateral surface. This different diameter is advantageously larger than the remaining lateral surface. With a larger diameter, a larger area is available for the press-fit connection, which increases the security against detachment of the connection. On the other hand, the second housing part is thus easier to produce if the larger diameter adjoins the radially projecting edge or, in other words, if the dimensions of the second housing part only decrease proceeding from the largest diameter.

BRIEF DESCRIPTION OF THE DRAWINGS

The invention is described in more detail on the basis of an exemplary embodiment. In the figures:

FIG. 1 shows a valve comprising a housing 1 with integrally molded socket 2 for an electrical connection of the valve. The housing 1 furthermore has an integrally formed flange 3 and three bores 3a, by which the housing 1 is flange-mounted on a turbocharger (not illustrated) in a region of the bypass line 4. In the installed position shown, the flange 3 is adjoined by a second housing part 13 composed of plastic. The second housing part 13 is connected to the housing 1 by a detent connection 14. In the housing 1, there is arranged a solenoid 5, a coil 6, and a metal pin 7. The metal pin 7 is connected to a pot-shaped piston 8, which, at the circumference of its base 9, has an axially projecting annular sealing surface 10. In the closed position shown, the sealing surface 10 bears against the valve seat 11 in order to close off the bypass line 4, so that no medium can flow from the line 4 into the line 12. Here, a spring 7 pushes the piston 8 in the direction of the valve seat 11. Concentrically with respect to the second housing part 13, in the housing 1, there is arranged a seal 16 which seals off the valve on the turbocharger and which is in the form of an O-ring in the housing 1.

The valve in FIG. 2 has substantially the same design as the valve in FIG. 1. A difference is that the second housing part 13 composed of a chromium-nickel steel has a wall thickness of 0.5 mm, and is a deep-drawn part. At its end facing toward the housing 1, the second housing part 13 has a radially outwardly pointing edge 15. The edge has twelve recesses 17 distributed uniformly over the circumference, which recesses are penetrated by the seal 16 composed of a fluorinated rubber, so that the seal 16 surrounds the radially projecting edge 15 in its radially outer region 18. The radially inner region 19 of the edge 15 forms an abutment surface, with which the second housing part 13 bears against a corresponding surface 20 when the second housing part 13 is pressed together with the housing 1. The second housing part 13 has a cylindrical lateral surface which has two diameters. Here, the larger diameter 22 adjoins the edge 15. This region of the cylindrical lateral surface 21 forms a part of the press-fit connection, wherein on the housing side a cylindrical portion 23, which is formed integrally on the housing, forms the other part of the press-fit connection. FIG. 3 shows the second housing part 13 with the seal 16, which surrounds the edge 15, wherein the seal 16, for captive arrangement on the housing part 13, fills recesses 17 formed in the edge 15. The radially projecting edge 15 is adjoined by a larger diameter 22 of the cylindrical lateral surface 21, which over the further course transitions into a smaller diameter. At its end averted from the housing 1, the second housing part 13 has a radially inwardly pointing collar 24. The collar 24 may for example serve for the arrangement of a further seal for the piston 8 (not illustrated).

FIG. 4 shows a detail of the second housing part 13 with the edge 15 and the collar 24. Different geometries of the recesses are illustrated by way of example in the radially projecting edge. Accordingly, circular 17', oval 17", arcuate 17''' or recesses 17'''' of polygonal shape, preferably tetragonal, are possible.

Figure 1:
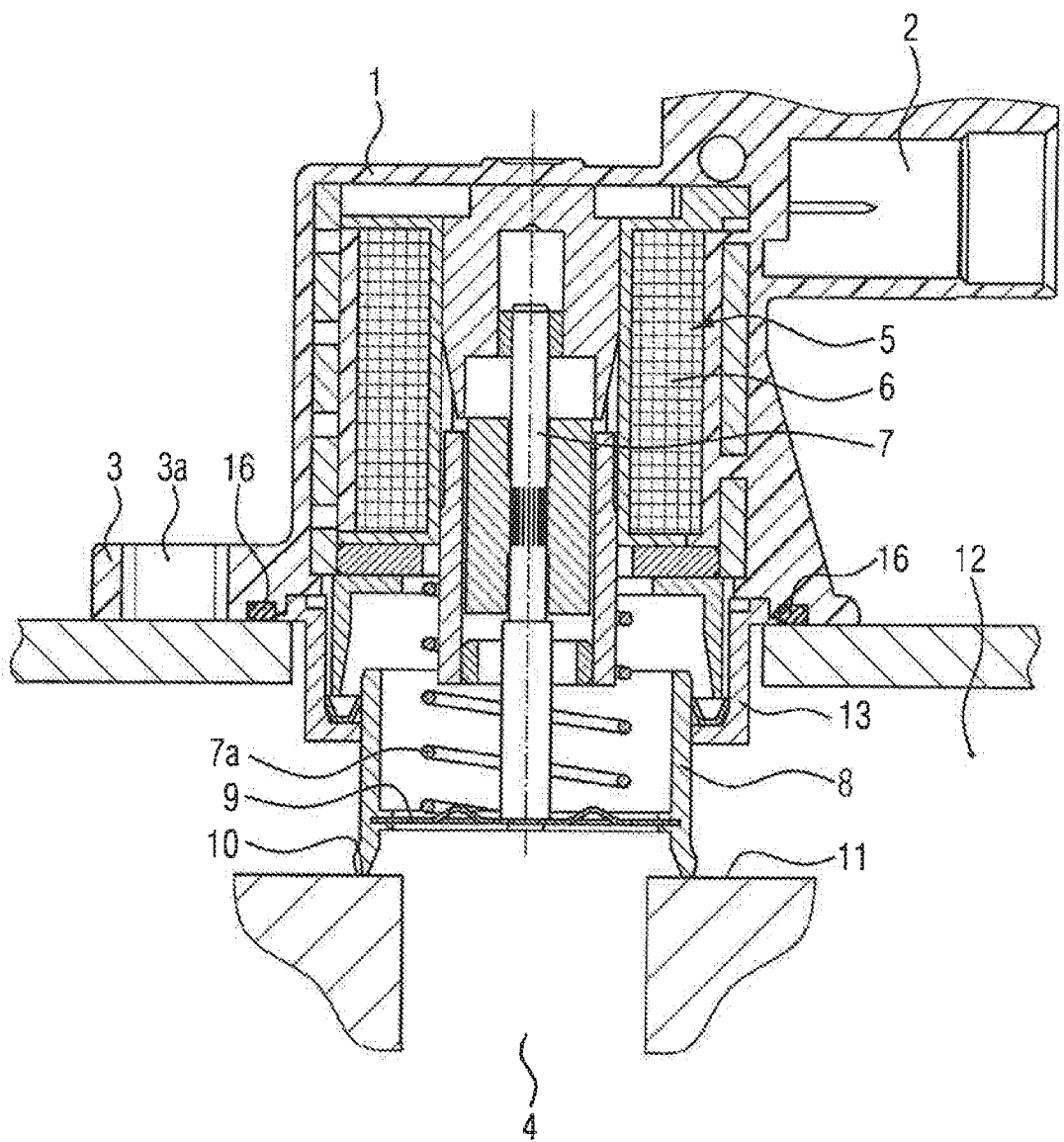
FIG. 1 is a sectional illustration of a valve according to the prior art.
Figure 2:
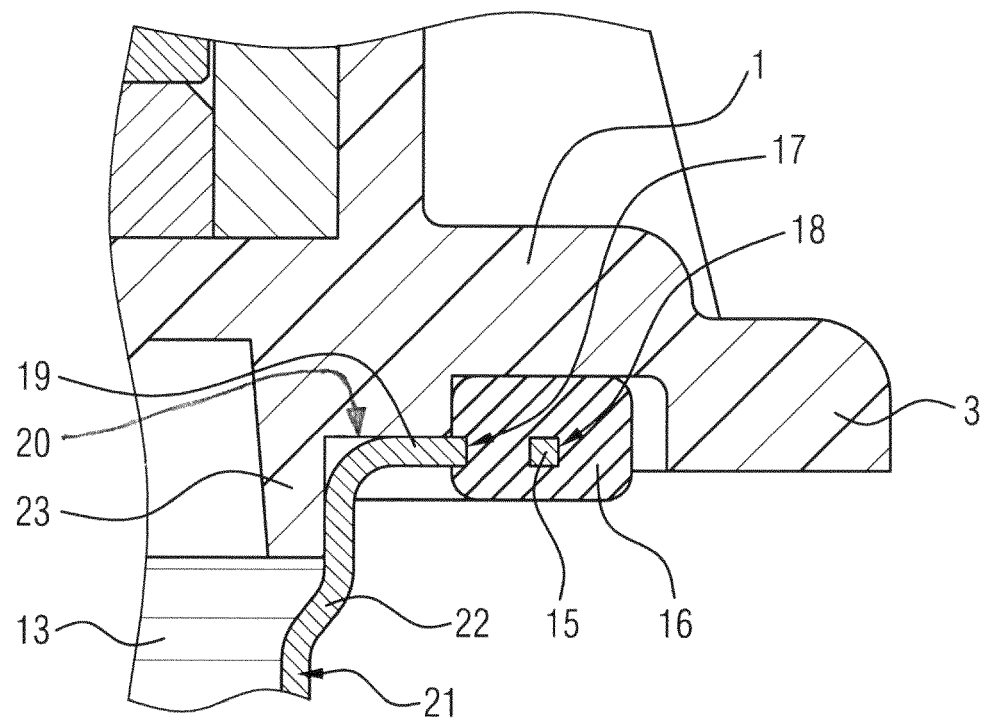
FIG. 2 is an enlarged sectional illustration of a valve according to one aspect of the invention.
Figure 3:
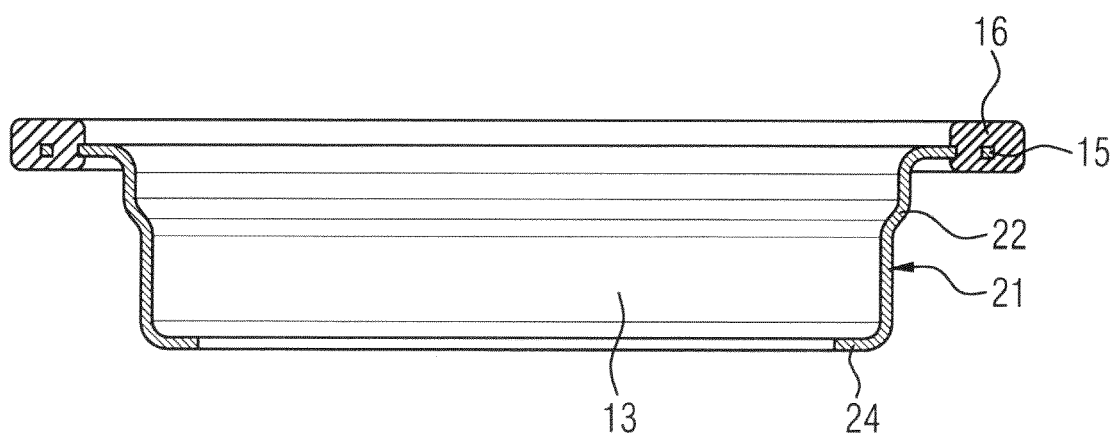
FIG. 3 is a sectional illustration of the second housing part.
Figure 4:
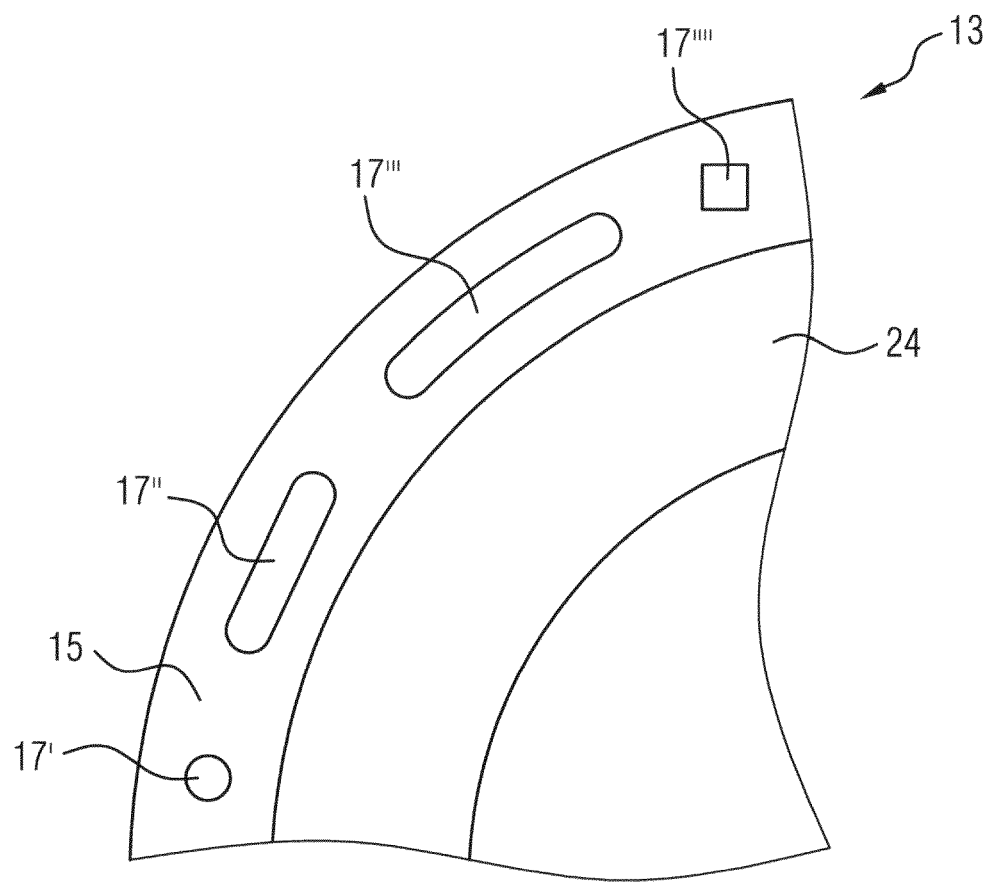
FIG. 4 shows refinements of the edge of the second housing part.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
   a housing;
   a solenoid arranged in the housing;
   a pin movable by the solenoid;
   a piston connected to the pin;
   a second housing part composed of metal that bears against the housing and which partially surrounds the piston, wherein the second housing part has, at its side facing toward the housing, a radially outwardly projecting edge that has recesses; and
   a seal for sealing off the valve formed on the radially outwardly projecting edge arranged on that side of the second housing part which faces toward the housing and on that side of the second housing part which faces away from the housing,
   wherein the seal is arranged at the radially outwardly projecting edge due to the seal surrounding at least one region of the radially outwardly projecting edge and penetrating the recesses,
   wherein a radially outer edge of the seal is radially beyond a radially outer edge of the radially outwardly projecting edge and a radially inner edge of the seal is radially inside the radially outer edge of the radially outwardly projecting edge.

2. The valve as claimed in claim 1, wherein the second housing part is composed of at least one of high-grade steel and a chromium-nickel steel.

3. The valve as claimed in claim 1, wherein the second housing part is a deep-drawn part.

4. The valve as claimed in claim 1, wherein the second housing part has a wall thickness of at least one of 0.3 mm to 3 mm and 0.5 mm to 1 mm.

5. The valve as claimed in claim 1, wherein the radially outwardly projecting edge at least one of 2 to 20 recesses, 3 to 12 recesses, and 4 to 8 recesses.

6. The valve as claimed in claim 1, wherein the recesses are circular or are extended along a circumference of the radially outwardly projecting edge.

7. The valve as claimed in claim 1, wherein the recesses account for no more than one of 30% of an area of the edge and no more than 20% of the area of the radially outwardly projecting edge.

8. The valve as claimed in claim 1, wherein the second housing part is pressed together with the housing.

9. The valve as claimed in claim 8, wherein the second housing part is pressed together with a cylindrical portion of the housing.

10. The valve as claimed in claim 1, wherein the edge has recesses that are circular or are extended along a circumference of the radially outwardly projecting edge.

\* \* \* \* \*